(12) United States Patent
Jung et al.

(10) Patent No.: US 6,922,143 B2
(45) Date of Patent: Jul. 26, 2005

(54) SERIAL BUS TYPE CONFIGURATION RECOGNITION AND ALARM APPARATUS

(75) Inventors: Eui Suk Jung, Daejeon (KR); Byoung Whi Kim, Kyungki-do (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 62 days.

(21) Appl. No.: 10/419,676

(22) Filed: Apr. 21, 2003

(65) Prior Publication Data

US 2003/0229732 A1 Dec. 11, 2003

(30) Foreign Application Priority Data

Jun. 10, 2002 (KR) .................................. 10-2002-0032260

(51) Int. Cl.⁷ .............................. G08B 29/00; G06F 3/00
(52) U.S. Cl. ...................... 340/506; 340/505; 340/507; 340/3.43; 361/761; 710/10; 700/21
(58) Field of Search ................................. 340/506, 505, 340/507, 3.1, 3.43, 3.5; 710/3, 10; 361/810, 760, 761; 700/9, 17, 21

(56) References Cited

U.S. PATENT DOCUMENTS 5,237,567 A * 8/1993 Nay et al. .................... 370/438
5,327,553 A * 7/1994 Jewett et al. .................... 714/3
6,426,697 B1   7/2002 Capowski et al. .......... 340/506
2003/0023800 A1 * 1/2003 Knaack et al. .............. 710/300

OTHER PUBLICATIONS

The 12th Joint Conference on Communications and Information, Final Program and Abstracts, JCCI 2002, 7 pages.

* cited by examiner

*Primary Examiner*—Donnie L. Crosland
(74) *Attorney, Agent, or Firm*—Blakely Sokoloff Taylor & Zafman (57) ABSTRACT

A serial bus type configuration recognition and alarm apparatus for a system having a plurality of various boards. The apparatus includes a plurality of first transmission units, a second transmission unit and a recognition unit. The first transmission units report board Identifications (IDs) and board failure status information through a first serial bus. The second transmission unit is connected to the first transmission units to report the board IDs, the board failure status information and an ID thereof. The recognition unit is connected to the second transmission unit to ascertain the configuration and failure status of the boards and report received board IDs and board failure status to a terminal.

9 Claims, 8 Drawing Sheets

SERIAL BUS TYPE CONFIGURATION RECOGNITION AND ALARM APPARATUS

BACKGROUND OF THE INVENTION

1. Field of the Invention

The present invention relates generally to a serial bus type configuration recognition and alarm apparatus, and more particularly to a serial bus type configuration recognition and alarm apparatus having a recognizing function of a communication system configuration and a alarm function, which is capable of recognizing the configuration of the system, collecting the failure status information of the recognized configuration, and self-diagnosing the failure of a recognition unit for ascertaining the configuration of the system, independently of the other functions of the communication system.

2. Description of the Prior Art

In general, a switch includes boards having a plurality of independent processors, and is physically connected to end user terminals through User Network Interfaces (UNIs). Communication channels are formed using Permanent Virtual Circuits (PVCs) and switch links are connected between the boards, so messages are transmitted through Inter-Processor Communication (IPC). It is important to a communication system having a plurality of boards to detect whether each board have been positioned correctly and failure status of each board in the communication system. The check of the position of the boards is related to a configuration recognition function, and the check of the failure status of boards is related to an alarm function.

Figure 1:
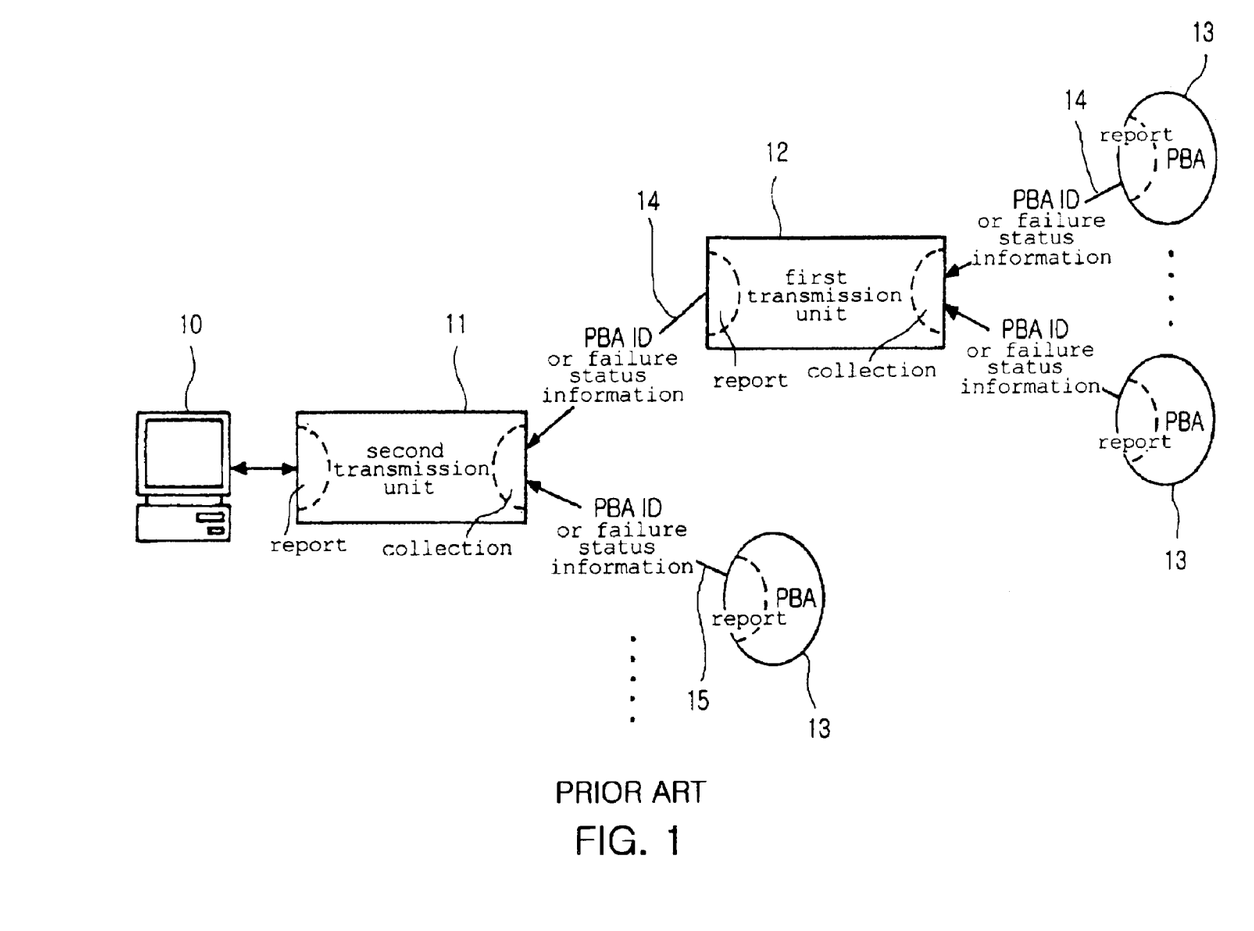
FIG. 1 is a diagram showing the construction of a conventional configuration recognition and alarm apparatus.

FIG. 1 is a diagram showing the construction of a conventional configuration recognition and alarm apparatus. As illustrated in FIG. 1, each of first transmission units 12 collects Printed circuit Board Assembly (PBA) IDentifications (IDs) or failure state information 14 transmitted from one or more PBAs 13 and reports them to a second transmission unit 11, and the second transmission unit 11 collects the PBA IDs or failure status information 14 reported by the first transmission unit 12 and PAB IDs or failure status information 14 and finally reports them to a terminal 10. Alternatively, there is provided a non-hierarchical type apparatus without the first transmission units 12. This type of apparatus is useful to systems in which the number of PBAs whose BOARD IDs or failure state information should be ascertained is small, while it is disadvantageous in a large-sized system on which various and multiple boards are mounted. That is, the non-hierarchical type apparatus is disadvantageous in that it is difficult to manage connection cables and the number of ports to be handled by a transmission unit is physically limited, so it is difficult to collect the PBA status information of a sufficient number of PBAS.

In the case of a hierarchical and bus type apparatus of the conventional configuration recognition and alarm apparatuses, the alteration and implementation of the apparatus is not easy because a parallel system bus is employed or ID information setting is fixed, and the maintenance and repair of the apparatus is difficult because the apparatus exists in PBAs in the form of additional circuits. Furthermore, most conventional bus type apparatuses cannot support hierarchical construction, so they are constructed in non-hierarchical forms, thus causing the extension of the apparatus to be difficult at the time of adding PBAs.

In addition, the conventional configuration recognition and alarm apparatus is disadvantageous in that the apparatus cannot perform the continuous collection of information at the time of an apparatus failure because the apparatus is not operated in a redundant manner, the apparatus has low flexibility because connection setting is adjusted to recognize the configuration of a changed system at the time of reconstructing a system, and the hardware and software implementation of the apparatus is not simple because the apparatus is linked with other functions to implement the recognition of configuration.

SUMMARY OF THE INVENTION

The present invention provides a serial bus type configuration recognition and alarm apparatus for a hierarchical or non-hierarchical communication system, which can increase the number of boards whose configuration and failure status information can be collected, support hierarchical construction, correctly detect the problems of a data path and be operated in a redundant manner, thereby facilitating the maintenance of the apparatus and improving the reliability of the apparatus, and which is independent of the other functions of the system and has simple construction, thereby facilitating the implementation and extension of the apparatus and providing flexibility to the apparatus.

In order to accomplish the above object, the present invention provides a serial bus type configuration recognition and alarm apparatus for a system having a plurality of various boards, comprising: a plurality of first transmission units adapted to hold type information of the boards, for reporting board IDentifications (IDs) held by the first transmission units and board failure status information transmitted from the boards through a first serial bus; a second transmission unit connected to the first transmission units through a first serial bus, for collecting board IDs and board failure status information transmitted from the first transmission units, reporting these collected board IDs and the board failure status information, and transmitting an ID of the second transmission; and a recognition unit connected to the second transmission unit through a second serial bus, for collecting board IDs and board failure status information transmitted from the second transmission unit, ascertaining configuration and failure status of the boards, and reporting these collected board IDs and board failure status to a terminal; wherein when the recognition unit requests the board IDs and board failure status information from the first transmission units, the second transmission unit connects the first serial bus with the second serial bus and the first transmission units transmit the board IDs and board failure status information thereof to the recognition unit through the connected first and second serial buses, and when the recognition unit requests the ID of the second transmission unit from the second transmission unit, the second transmission unit transmits the corresponding ID thereof to the recognition unit through the second serial bus.

Preferably, each of the first transmission units may comprise a board ID setting unit for setting a corresponding one of the board IDs; a collecting unit for collecting the board ID set by the board ID setting unit and the board failure status information transmitted from a corresponding board and transmitting these collected board ID and board failure status information to the recognition unit when the recognition unit calls the first transmission unit; and a first serial bus setting unit for connecting the collecting unit to the first serial bus if a preset slot ID of the first transmission unit coincides with a slot ID of the first transmission unit called by the recognition unit.

Preferably, the first transmission unit further comprises a redundant power control unit for controlling power inputted from the corresponding board and power inputted from the second transmission unit in a redundant manner.

Preferably, the second transmission unit may comprise: an ID setting unit for setting an ID of the second transmission unit; a position information setting unit for setting a position value of the second transmission unit; a first serial bus setting unit for connecting the first serial bus with the second serial bus if a position value of the second transmission unit called by the recognition unit coincides with the position value set by the position information setting unit; a collecting unit for collecting the ID of the second transmission unit from the ID setting unit and transmitting the collected ID of the second transmission unit to the recognition unit if a position value of the second transmission unit called by the recognition unit coincides with the position value set by the position information setting unit; and a second serial bus setting unit for connecting the collecting unit with the second serial bus to transmit the collected ID of the second transmission unit to the recognition unit.

Preferably, the second transmission unit may further comprise a redundant power control unit for controlling power inputted from a back board on which the second transmission unit is mounted and power inputted from the recognition unit in a redundant manner.

Preferably, the recognition unit may comprise an external communication unit for performing serial communication with the terminal; a processor for controlling the external communication unit and generating and transmitting position and slot information to select the first and second transmission units so as to collect the board IDs and the board failure status information; a bus drive unit for requesting transmission of information from the first and second transmission units, by converting the position and slot information transmitted from the processor into serial data and thus driving the second serial bus; and a control unit for controlling the external communication unit, the processor and the bus drive unit by generating various control signals corresponding to commands of the processor.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 2:
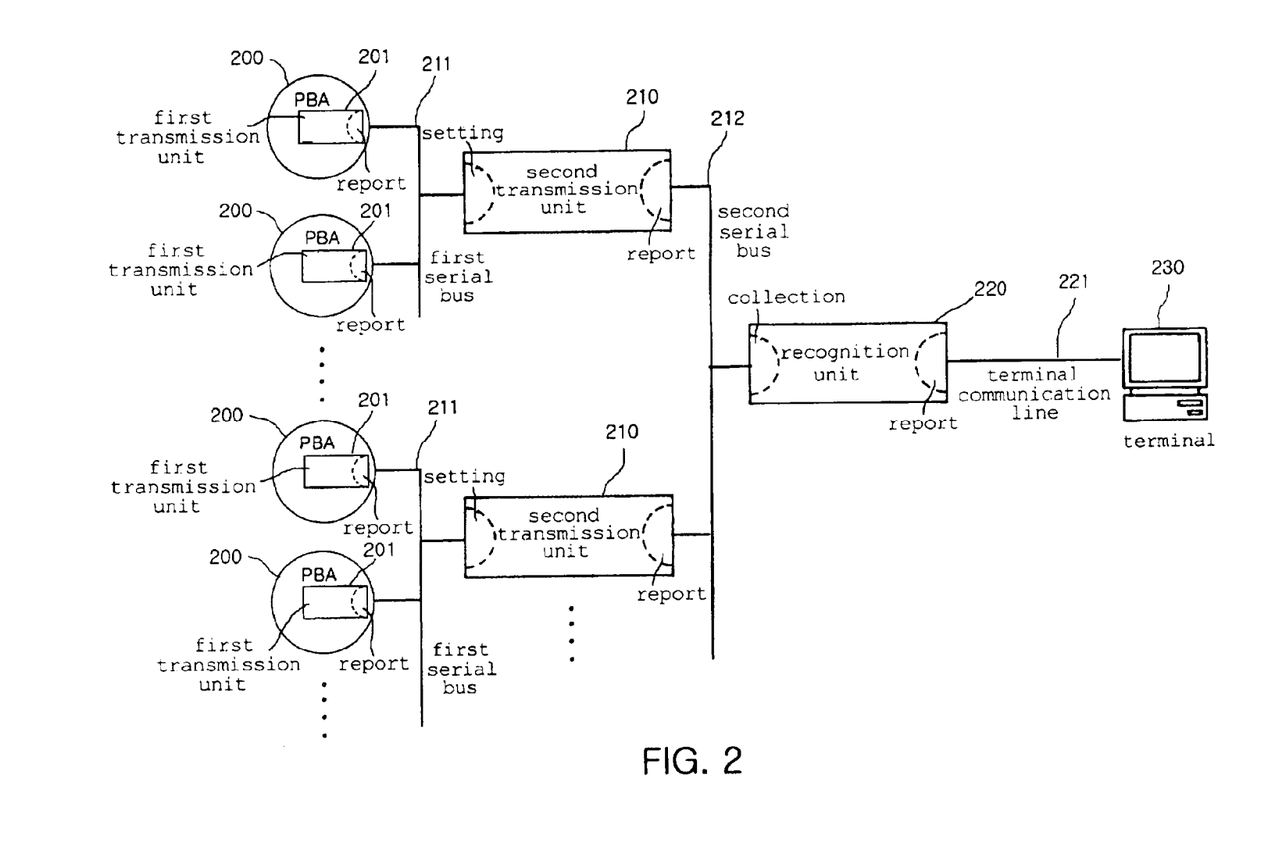
FIG. 2 is a diagram showing the construction of a serial bus type configuration recognition and alarm apparatus in accordance with the present invention.

FIG. 2 is a diagram showing the construction of a serial bus type configuration recognition and alarm apparatus in accordance with the present invention. Referring to FIG. 2, a variety of PBAs 200 constituting a system may be boards or devices. A first transmission unit 201 holding information on the type of a board exists in the PBA 200, and functions to report its board ID and PRA failure status information. The first transmission unit 201 is connected to a second transmission unit 210 through a first serial bus.

In the meantime, the second transmission unit 210 is connected to a recognition unit 220 through a second serial bus 212. The second transmission unit 210 functions to connect the second serial bus 212 with the first serial bus 211 when the recognition unit 220 requests a board ID and PBA failure status information held by the first transmission unit 201, and to transmit a board ID held by the second transmission unit 210 to the recognition unit 220 when the recognition unit 220 requests the board ID held by the second transmission unit 210.

The recognition unit 220 is connected to a terminal 230 through a terminal communication line 221. The recognition unit 220 functions to check the failure status of the first and second transmission units 201, collect information and report the collected information to the terminal 230 through the terminal communication line 221.

Figure 3:
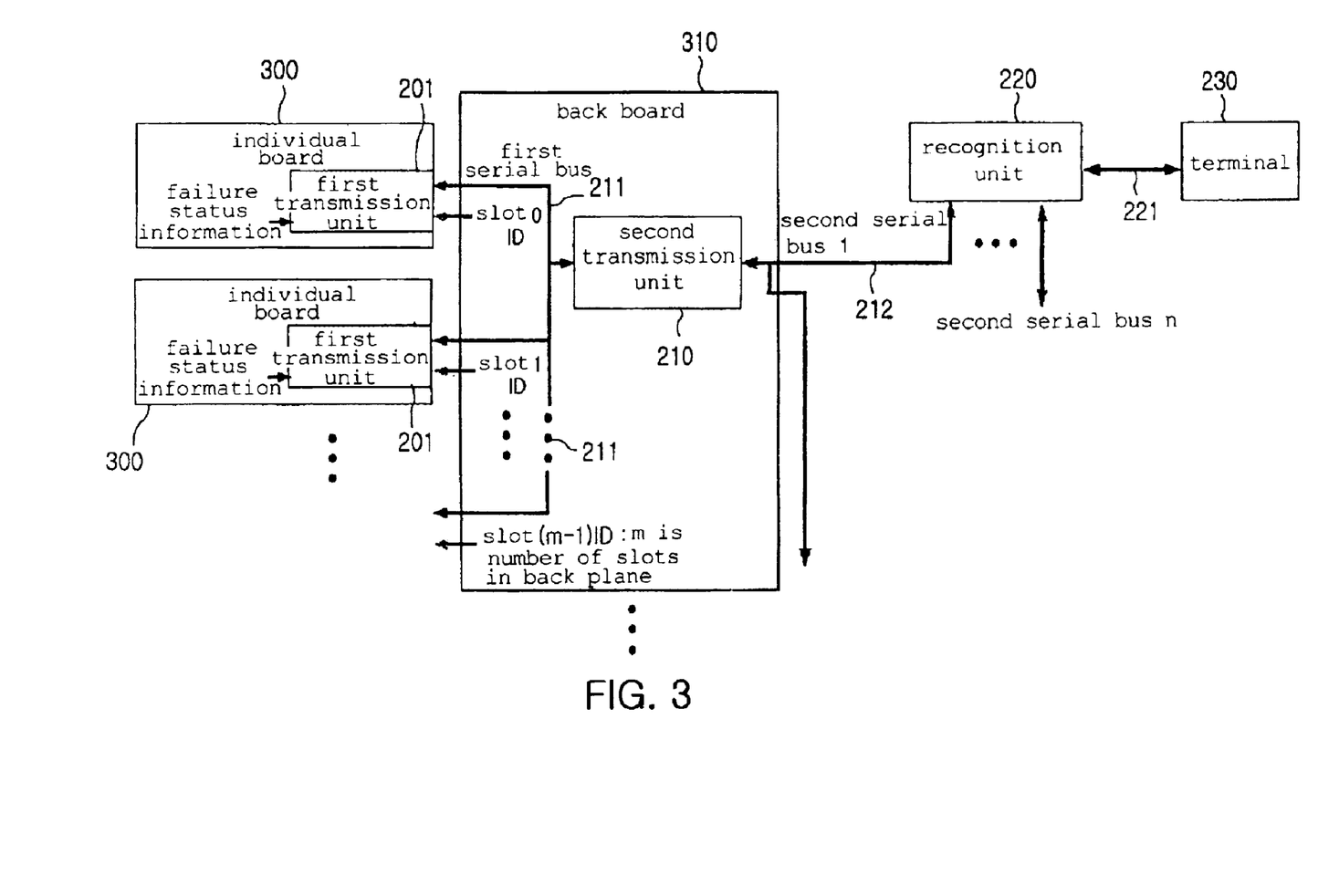
FIG. 3 is a diagram showing a structure that implements the construction of the apparatus of FIG. 2 and includes individual boards, a back board, a recognition unit and a terminal.

FIG. 3 is a diagram showing a structure that implements the construction of the apparatus of FIG. 2 and includes individual boards, a back board, a recognition unit and a terminal, which is an example to which the apparatus of the present invention is applied. The functions of elements of FIG. 3 are the same as described in conjunction with FIG. 2. As depicted in FIG. 3, a second transmission unit 210 exists in a back board 310, and is connected to a recognition unit 220 through a second serial bus 212 and to second transmission units 201 of individual boards 300 through a first serial bus 211. n second serial buses are connected to the recognition unit 220. If the number of back boards 310 to be connected to a single second serial bus 212 is excessive, remaining back boards 310 are connected to other second serial buses 212. That is, n second serial buses 212 are provided, and each connected to back boards 310. The second transmission unit 210 and the first transmission unit 201 can be implemented in the back board 310 and the PBA (not shown), but implemented as parts so as to facilitate repair and maintenance.

The first transmission unit 201 is connected to one of a plurality of slots of the back board 310. The plurality of slots are assigned slot IDs, respectively. The slot IDs may be set according to the number of slots in the backplane of the back board 310. That is, the first transmission unit 201 is assigned a slot ID according to a position in the back board 310 to which the first transmission unit 201 is connected, and the slot ID applying unit sets the slot ID of the first transmission unit 201 and applies it to the first transmission unit 201.

If the recognition unit 220 calls the first transmission unit 201 in the position of a slot (according to the slot ID) holding a board ID and PBA failure status information when the recognition unit 220 desires to know the board ID and the PBA failure status information, the first transmission unit 201 determines whether the slot ID transmitted from the recognition unit 220 coincides with the slot ID applied from the slot ID applying unit. If the two slot IDs coincide with each other, the first transmission unit 201 transmits the board ID and the PBA failure status information to the recognition unit 220 through the first serial bus 211; while if the two slot IDs do not coincide with each other, the first transmission unit 220 takes no action.

A method of distinguishing the first transmission unit 201 and the second transmission unit 210 according to an operation of the recognition unit 220 is described with reference to FIGS. 4 and 5.

Figure 4:
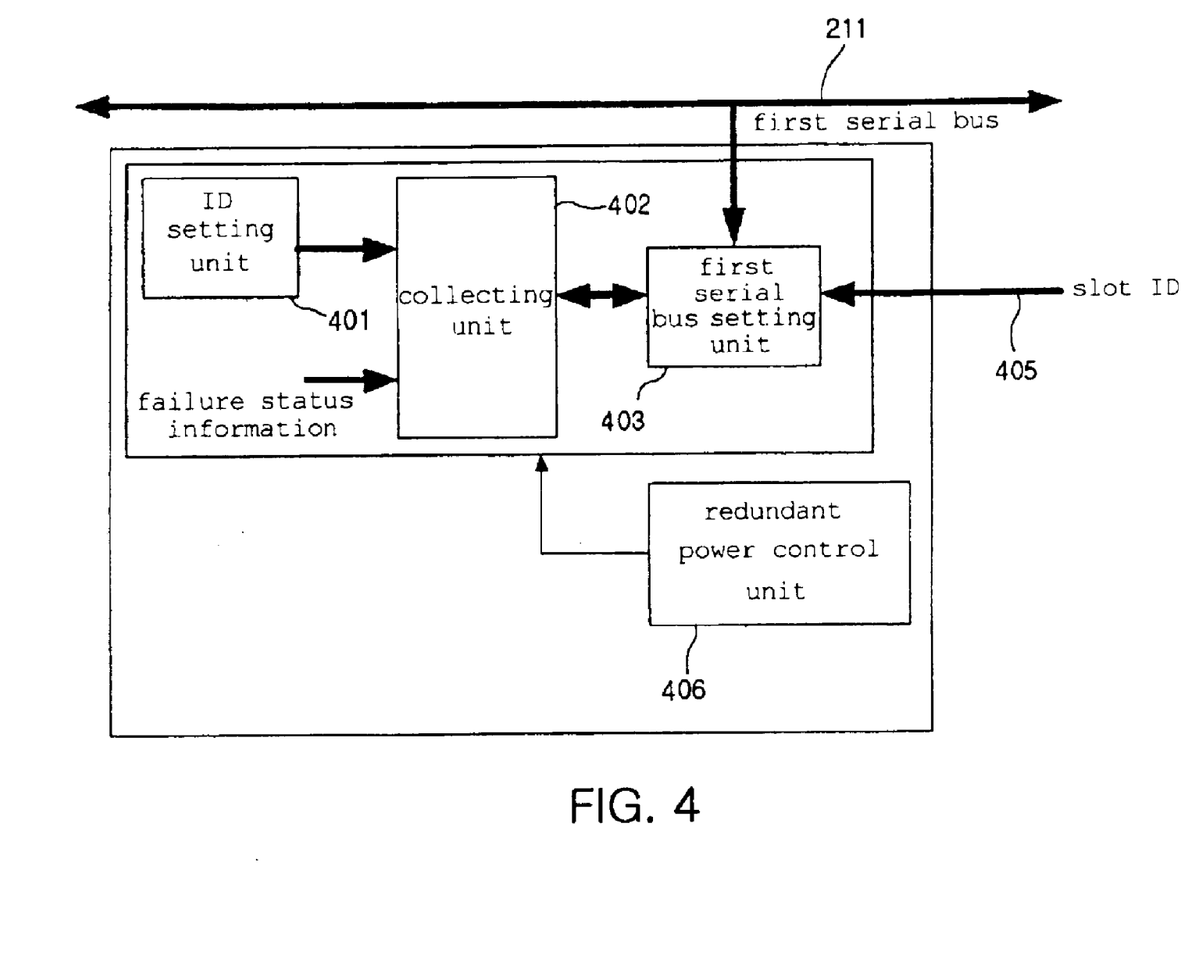
FIG. 4 is a diagram showing the construction of a first transmission unit according to the present invention.

FIG. 4 is a diagram showing the construction of the first transmission unit according to the present invention. As illustrated in FIG. 4, the first transmission unit 201 of the present invention includes a board ID setting unit 401, a collecting unit 402, a first serial bus setting unit 404, and a redundant power control unit 406. The collecting unit 402 collects an ID of the first transmission unit 201 and the failure status information of a corresponding PBA in response to a call from the recognition unit 220. The first serial bus setting unit 403 receives the position information of a slot by receiving a slot ID 405 applied from the outside. The slot ID 405 is set at a slot ID applying unit (not shown) according to the position of the slot of the back board 310 to which the first transmission unit 201 is connected, and applied to the first transmission unit 201. Thus, the position information of the first transmission unit 201 can be obtained based on the slot ID.

Although not shown in FIG. 4, the first transmission unit 201 is connected to another first transmission unit 201 of another individual board 300 through the first serial bus 211 and to the second transmission unit 210 of the back board 310.

When the recognition unit 220 desires to know a board ID and PBA failure information held by the first transmission unit 201, the recognition unit 220 causes the second transmission unit 210 connected to the first transmission unit 201 to connect the second serial bus 212 with the first serial bus 211, and calls the first transmission unit 201 existing at the position of a slot holding the board ID and the PEA failure status information. The first transmission unit 201 compares a slot ID based on the position information of the slot called by the recognition unit 220 with the slot ID 405 applied from the slot ID applying unit to the first transmission unit 201. If the two slot IDs coincide with each other, the first serial bus setting unit 403 connects the first serial bus 211 with the collecting unit 402, and the recognition unit 402 hands over an ID set at the board ID setting unit 401 and failure status information collected by a PBA to the recognition, unit 220 through the connected serials buses 212 and 211. If the two slot IDs do not coincide with each other, the first serial bus setting unit 503 takes no action.

Meanwhile, reference numeral 406 designates a redundant power control unit of the first transmission unit 201. The first transmission unit 201 is supplied with one of two types of power as input power: power directly inputted from a corresponding PBA, and spare power supplied by the second transmission unit 210. Accordingly, the first transmission unit 201 can be operated regardless of the PBA power failure. As described above, the redundant power control unit 406 controls power in a redundant manner, so it allows the first transmission unit 201 to be operated without disruption at the time of power failure.

Figure 5:
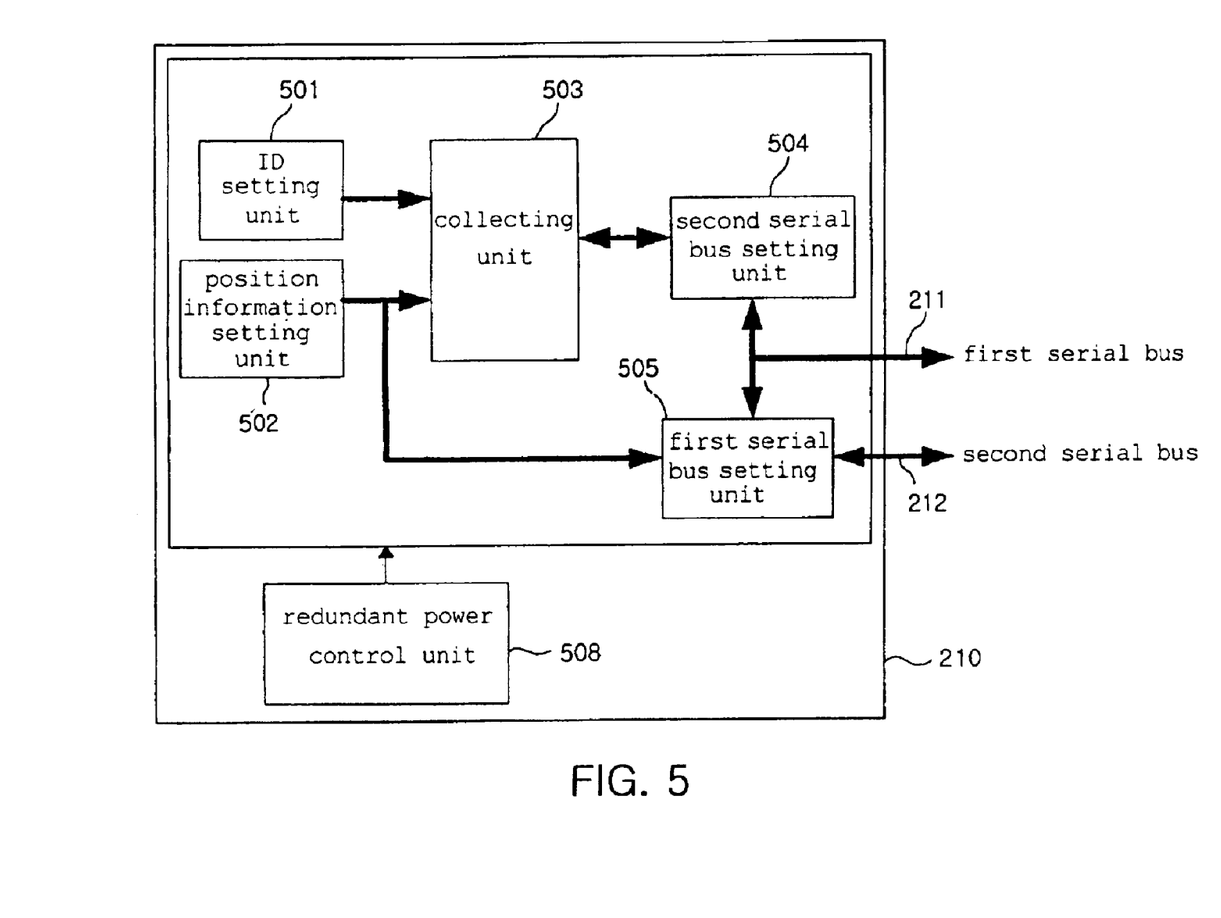
FIG. 5 is a diagram showing the construction of a second transmission unit according to the present invention.

FIG. 5 is a diagram showing the construction of the second transmission unit according to the present invention. As illustrated in FIG. 5, the second transmission unit 210 of the present invention includes an ID setting unit 501, a position information setting unit 502, a collecting unit 503, a first serial bus setting unit 505, a second serial bus setting unit 504 and a redundant power control unit 508, and performs serial communication with the recognition unit 220 through the second serial bus 212. When the recognition unit 220 calls a second transmission unit 210 in a position having ID which the recognition unit 220 desires to know, the first serial bus setting unit 505 compares the value of the position called by the recognition unit 220 with the value of a position set by the position information setting unit 502. If the two values coincide with each other, the first serial bus setting unit 505 connects the second serial bus 212 with the first serial bus 211. If the two values do not coincide with each other, the second transmission unit 210 takes no action. When the second serial bus 212 is connected to the first serial bus 211 as described above, the collecting unit 503 collects the ID value of the second transmission unit 210 set by the ID setting unit 501, and transmits it both to the first transmission unit 201 through the second serial bus setting unit 504 and the first serial bus 211 and to the recognition unit 220 through the second serial bus setting unit 504, the first serial bus setting unit 505 and the second serial bus 212. When the recognition unit 220 calls the ID value set by the ID setting unit 501 so as to know the ID value of the second transmission unit 210 after the second serial bus 212 is connected to the first serial bus 211, the collecting unit 503 collects the ID value from the position information setting unit 502, and transmits it to the recognition unit 220 through the first serial bus setting unit 505 and the second serial bus 212.

In the meantime, reference numeral 508 designates a redundant power control unit of the second transmission unit 210. The second transmission unit 210 is supplied with one of two types of power as input power: power directly inputted to the back board 310, and spare power supplied by the recognition unit 220. Accordingly, the second transmission unit 210 can be operated even though the power failure of the back board 210 occurs. Although the signal connection of the redundant power control unit 508 is not illustrated in FIG. 5, power applied to the second transmission unit 210 is controlled in a redundant manner, so the second transmission unit 210 is operated without disruption at the time of power failure.

At this time, in FIGS. 4 and 5, it should be noted that the collecting unit 402 and first serial bus setting unit 403 of FIG. 4 are different from the collecting unit 503 and the first serial bus setting unit 504, respectively.

Figure 6:
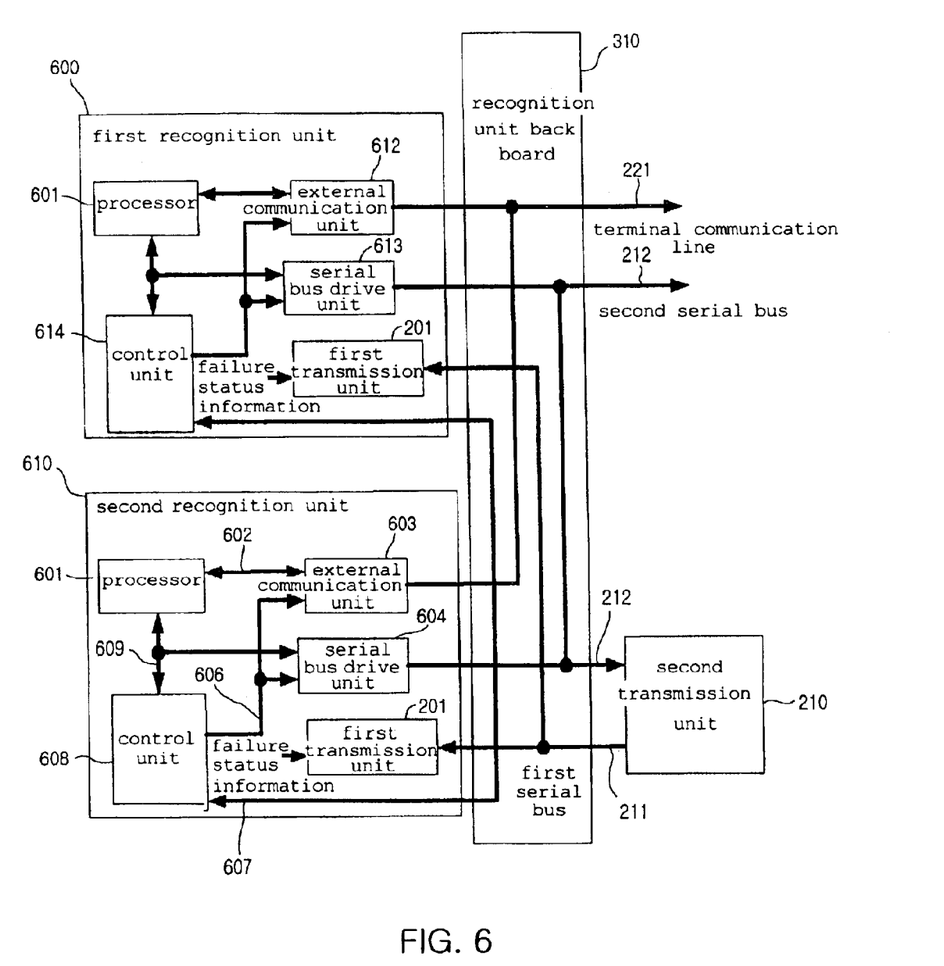
FIG. 6 is a diagram showing the construction of a recognition unit according to the present invention.

FIG. 6 is a diagram showing the construction of the recognition unit according to the present invention. Referring to FIG. 6, a first recognition unit 600 and a second recognition unit 610 are identical units, and therefore can communicate with the terminal 230 through the terminal communication line 221 and share the second serial bus 212. Additionally, in order to mutually monitor the two recognition units 600 and 610, the two recognition units 600 and 610 exchange redundant control signals 607 with each other. Accordingly, when one recognition unit 600 or 610 is in an active state, the other recognition unit 610 or 600 is converted to a standby state; while when a failure occurs in the former recognition unit 600 or 610 in the active state, the latter recognition unit 610 or 600 is converted from the standby state to the active state. Therefore, even though a failure occurs in one recognition unit, the other recognition unit can be continuously operated.

In the recognition units 600 and 610, external communication units 603 and 612 perform communications with the terminal 230 and serial bus drive units 604 and 613 drive the second serial bus 212. Additionally, control units 608 and 614 control corresponding blocks by generating various control signals 606 corresponding to the commands of processors 608 and 614. When the processor 608 or 614 transmits position and slot information adapted to select the first and second transmission units 201 and 210 to the serial bus drive unit 604 or 613 through the an address data bus 609 in the recognition unit 600 or 610 so as to collect information as described with reference to FIGS. 4 and 5, the serial bus drive unit 604 or 613 converts the position and slot information into serial data and requests the transmission of information from the first and second transmission units 201 and 210 through the second serial bus 212 using the serial data. In the case where the number of PBAs whose information is collected are excessive and the PBAs cannot be handled by a single second serial bus 212, a plurality of serial bus drive units 604 may be positioned in the recognition units 600 and 610 and sufficient second serial buses 212 may be driven by the serial bus drive units 604, so sufficient PBAs constituting a hierarchical structure may be managed. When the recognition units 600 and 610 are treated as information collecting PBAs, first transmission units 201 and a second transmission unit 210 may be positioned in the recognition units 600 and 610 and back board 310 of the recognition unit 600 and 610, respectively.

The second serial bus 212 is identical with the first serial bus 211 in construction and operation, but a bus connecting the second transmission unit 210 with the recognition unit 600 or 610 is called the second serial bus 211. The first serial bus 211 functions as a data path for accessing the first serial bus setting unit 505 in the second transmission unit 210 or the first serial bus setting unit 403 in the first transmission unit 201.

There are six serial bus signals, which can be classified into four indispensable signals including a serial bus clock, a command mode selection signal, a data output signal and a data input signal, and two optional signals including a reset signal and a first power signal.

The reset signal of the optional signals is used to perform entire serial bus asynchronous initialization, and the first power signal of the optional signals allows the collection of IDs and failure status information to be performed without hindrance by replacing the main power of a board with the first power of the serial bus at the time when a failure occurs in the main power of the board on which the first or second transmission unit is mounted.

Figure 7:
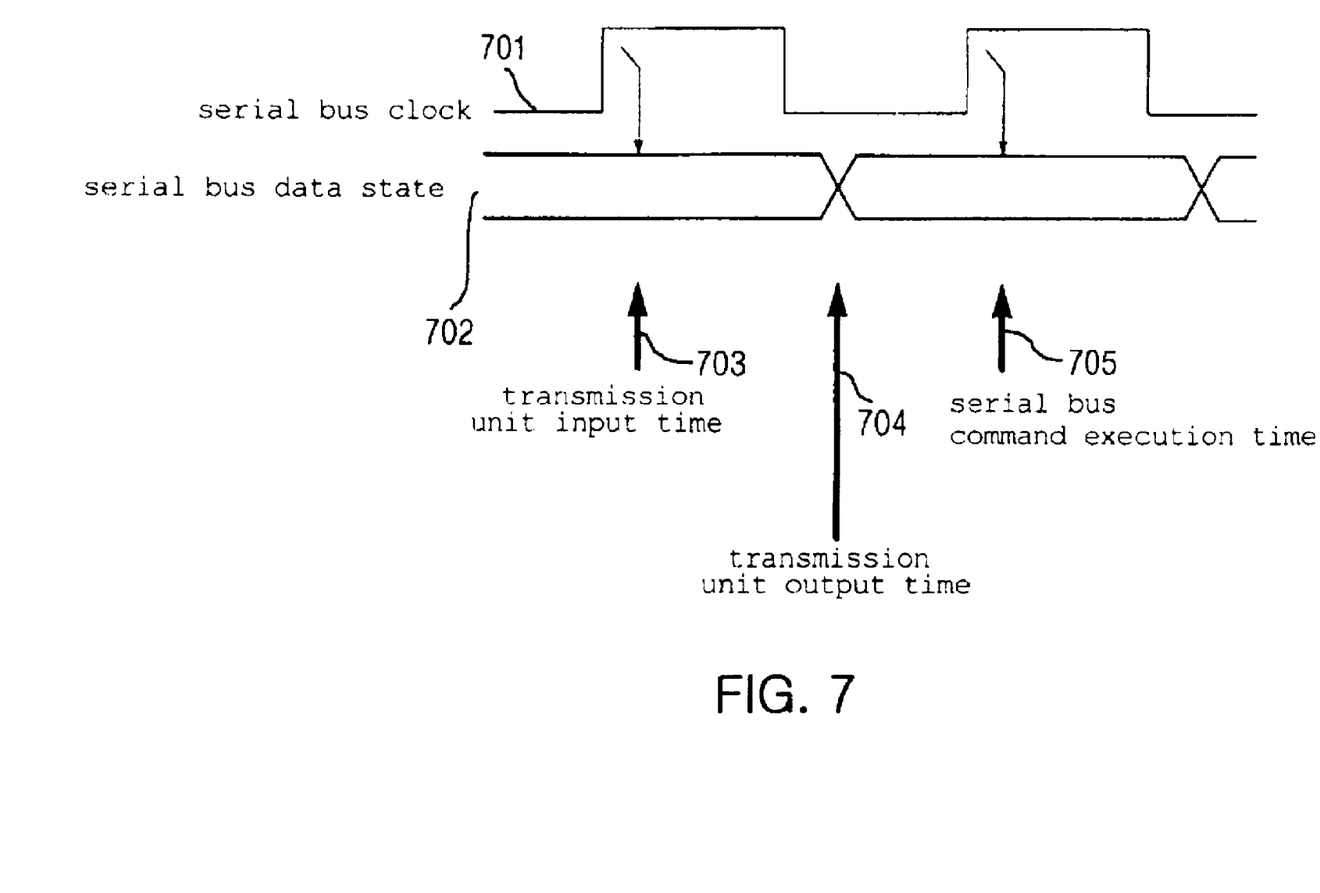
FIG. 7 is a serial bus signal timing chart according to the present invention.

The serial bus clock of the indispensable signals functions as a reference clock for the operation of the serial bus. FIG. 7 is a timing chart of the data input and output signals of the transmission unit with reference to the serial bus clock. At the time when a serial bus clock 701 is changed from 0 to 1, the transmission unit inputs output data of the serial bus and a command mode selection value at a time 703. The processed results according to the inputted data and command are transmitted as a serial bus data input signal at the output time 704 of the transmission unit. The transmission unit inputs a next command or data to input at the time 705 when the serial bus clock is changed from 0 to 1.

For a command to be monitored via serial bus values and be executed in the first and second transmission units 201 and 210, there is a sample command to output the values of the collecting units 402 and 503 of the transmission units 201 and 210. In the interval of no command execution, address selection signals inputted via input serial data in the serial bus are monitored. If one of the selection signals coincides with the position information 502 or slot ID 405, the second serial bus setting unit 505 and the first serial bus setting unit 403 and 504 connect the second serial bus with the first serial bus. If not, no action is taken.

Figure 8:
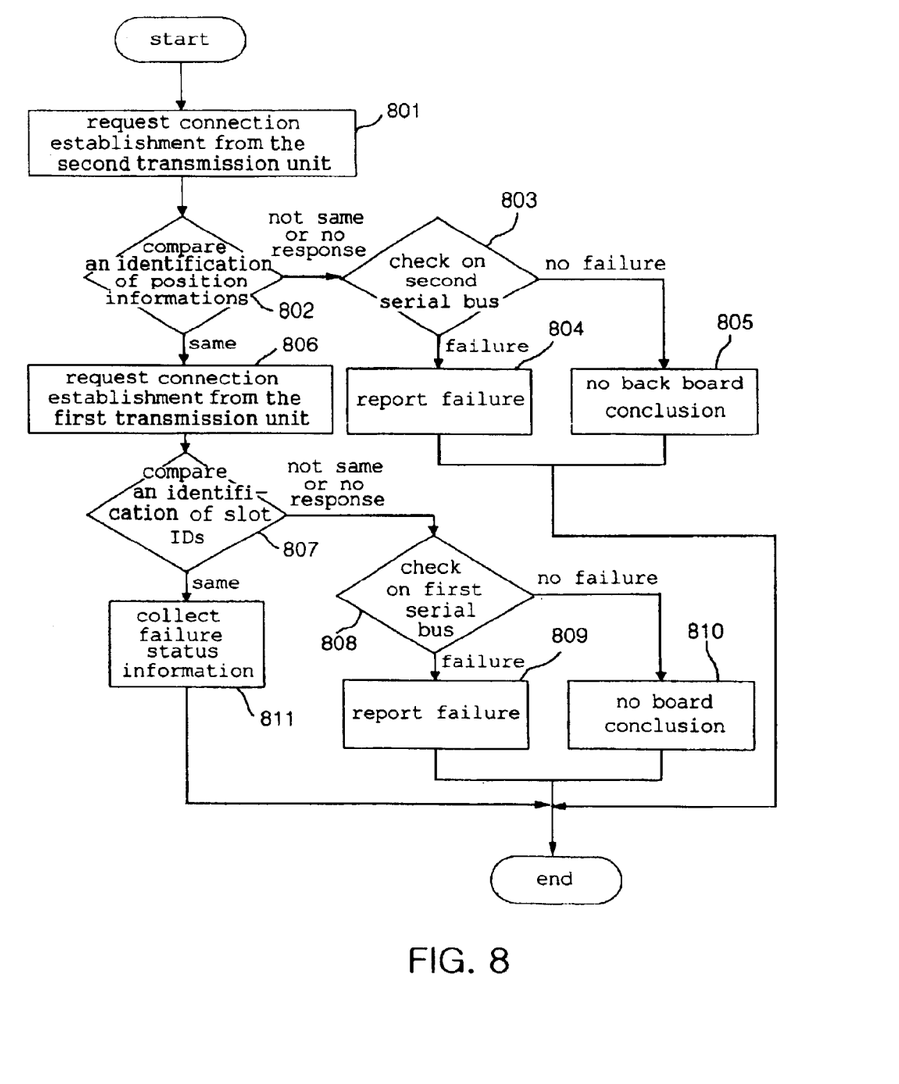
FIG. 8 is a flowchart showing the operation of the serial bus type configuration recognition and alarm apparatus of the present invention.

FIG. 8 is a flowchart showing the operation of the configuration recognition and alarm apparatus of the present invention. The recognition unit 220 requests connection establishment from the second transmission units 210 at the start of a performance period of the terminal 230 or recognition unit 210 at step 801. The second transmission units 210 compare the information of positions called by the recognition unit 210 with the position information thereof set by the position information setting units 502 to determine whether the position information coincide with each other at step 802. If the position information do not coincide with each other, one or more corresponding second transmission units 210 do not respond. If the recognition unit 220 does not receive a response as described above, the second serial bus 212 is checked for a failure at step 803. If the second serial bus 212 has no failure, the recognition unit 220 concludes one or more corresponding back boards 310 not to be mounted on the system at step 805 and then the process ends. In contrast, if a failure is found in the second serial bus 212, the recognition unit 220 reports the failure to the terminal 230 at step 804, and then the process ends.

However, if one or more transmission units 210, which have the position information coinciding with the information of the positions called by the recognition unit 220, exist, the recognition unit 220 requests connection establishment from the first transmission units 201 positioned at slots where boards, whose information the recognition unit 220 desires to correct, exist at step 806. The first transmission units 201 determine whether slot IDs transmitted by the second transmission unit 210 through the first serial bus 211 coincides with slot IDs individually transmitted by the slot ID applying units of the back boards 310 at step 807. If the slot IDs do not coincide with each other, one or more corresponding first transmission units 201 do not respond. If there is no a response as described above, the recognition unit 220 checks the first serial bus 211 for a failure at step 808. If the first serial bus 211 has no failure, the recognition unit 220 concludes one or more corresponding boards not to be mounted on the system at step 810 and then the process ends. In contrast, if a failure is found in the first serial bus 211, the recognition unit 220 reports the failure to the terminal 230 at step 809 and then the process ends.

In contrast, if the slot IDs transmitted by the second transmission unit 210 through the first serial bus 211 coincide with the slot IDs individually transmitted by the slot ID applying units of the back boards 310 at step 807, one or more corresponding first transmission units 201 reports their IDs and PBA failure status information at step 811, and then the process ends.

As described above, in accordance with the present invention, the configuration and failure status of boards constituting a system can be ascertained in real time, so the configuration and status of hardware for operating the system are always monitored and detected, thereby providing basic configuration information for the operation, management, and repair and maintenance of the system. Additionally, with the present invention, the cause of a failure can be correctly ascertained and time and labor required to overcome the failure can be saved when a recognition function fails due to the failure of a serial bus data path or recognition unit, and the failure of the entire information collecting function of the system can be prevented by cutting off the failure of a local information collecting function from the entire function of the system when the local information collecting function fails. The present invention supports the continuous operation of the apparatus, so the reliable and stable collection of information can be performed by the apparatus. The present invention supports hierarchical construction, so the extensibility of the apparatus is provided to add new boards to the apparatus and the flexibility of the apparatus is provided to require no additional work at the time, of altering the configuration of the apparatus. As a result, the management, operation and repair and maintenance of the boards of the entire system are facilitated, and the reliability of the system is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A serial bus type configuration recognition and alarm apparatus for a system having a plurality of various boards, comprising:
   a plurality of first transmission units adapted to hold type information of the boards, for reporting board IDentifications (IDs) held by the first transmission units and board failure status information transmitted from the boards through a first serial bus;
   a second transmission unit connected to the first transmission units through the first serial bus, for collecting board IDs and board failure status information transmitted from the first transmission units through a second serial bus, reporting these collected board IDs and the board failure status information, and transmitting an ID of the second transmission unit through the second serial bus; and
   a recognition unit connected to the second transmission unit through the second serial bus, for collecting board IDs and board failure status information transmitted from the second transmission unit, ascertaining configuration and failure status of the boards, and reporting these collected board IDs and board failure status to a terminal;
   wherein when the recognition unit requests the board IDs and board failure status information from the first transmission units, the second transmission unit connects the first serial bus with the second serial bus and the first transmission units transmit the board IDs and board failure status information thereof to the recognition unit through the connected first and second serial buses, and when the recognition unit requests the ID of the second transmission unit from the second transmission unit, the second transmission unit transmits the corresponding ID thereof to the recognition unit through the second serial bus.

2. The serial bus type configuration recognition and alarm apparatus according to claim 1, wherein each of the first transmission units comprises:
   a board ID setting unit for setting a corresponding one of the board IDs;
   a collecting unit for collecting the board ID set by the board ID setting unit and the board failure status information transmitted from a corresponding board and transmitting these collected board ID and board failure status information to the recognition unit when the recognition unit calls the first transmission unit; and
   a first serial bus setting unit for connecting the collecting unit to the first serial bus if a preset slot ID of the first transmission unit coincides with a slot ID of the first transmission unit called by the recognition unit.

3. The serial bus type configuration recognition and alarm apparatus according to claim 2, wherein the first transmission unit further comprises a redundant power control unit for controlling power inputted from the corresponding board and power inputted from the second transmission unit in a redundant manner.

4. The serial bus type configuration recognition and alarm apparatus according to claim 1, wherein the second transmission unit comprises:
   an ID setting unit for setting an ID of the second transmission unit;
   a position information setting unit for setting a position value of the second transmission unit;
   a first serial bus setting unit for connecting the first serial bus with the second serial bus if a position value of the second transmission unit called by the recognition unit coincides with the position value set by the position information setting unit;
   a collecting unit for collecting the ID of the second transmission unit from the ID setting unit and transmitting the collected ID of the second transmission unit to the recognition unit if a position value of the second transmission unit called by the recognition unit coincides with the position value set by the position information setting unit; and
   a second serial bus setting unit for connecting the collecting unit with the second serial bus to transmit the collected ID of the second transmission unit to the recognition unit.

5. The serial bus type configuration recognition and alarm apparatus according to claim 4, wherein the second transmission unit further comprises a redundant power control unit for controlling power inputted from a back board on which the second transmission unit is mounted and power inputted from the recognition unit in a redundant manner.

6. The serial bus type configuration recognition and alarm apparatus according to claim 1, wherein the recognition unit comprises:
   an external communication unit for performing serial communication with the terminal;
   a processor for controlling the external communication unit and generating and transmitting position and slot information to select the first and second transmission units so as to collect the board IDs and the board failure status information;
   a bus drive unit for requesting transmission of information from the first and second transmission units, by converting the position and slot information transmitted from the processor into serial data and thus driving the second serial bus; and
   a control unit for controlling the external communication unit, the processor and the bus drive unit by generating various control signals corresponding to commands of the processor.

7. The serial bus type configuration recognition and alarm apparatus according to claim 6, further comprising one or more first and second transmission units.

8. The serial bus type configuration recognition and alarm apparatus according to claim 1, wherein the recognition unit is constructed and operated in a redundant manner.

9. The serial bus type configuration recognition and alarm apparatus according to claim 1, wherein the recognition unit is connected to the second transmission unit through a plurality of second serial buses to manage configuration and failure state of a plurality of boards constructed in a hierarchical form.

* * * * *